June 12, 1956 L. H. EWALD 2,750,484
UNIFORM PRESSURE RESISTANCE WELDING APPARATUS
Filed March 7, 1955 2 Sheets-Sheet 1

INVENTOR.
Lux H. Ewald
BY
Churchill, Rich, Weymouth & Engel
Attorneys

June 12, 1956 — L. H. EWALD — 2,750,484
UNIFORM PRESSURE RESISTANCE WELDING APPARATUS
Filed March 7, 1955 — 2 Sheets-Sheet 2
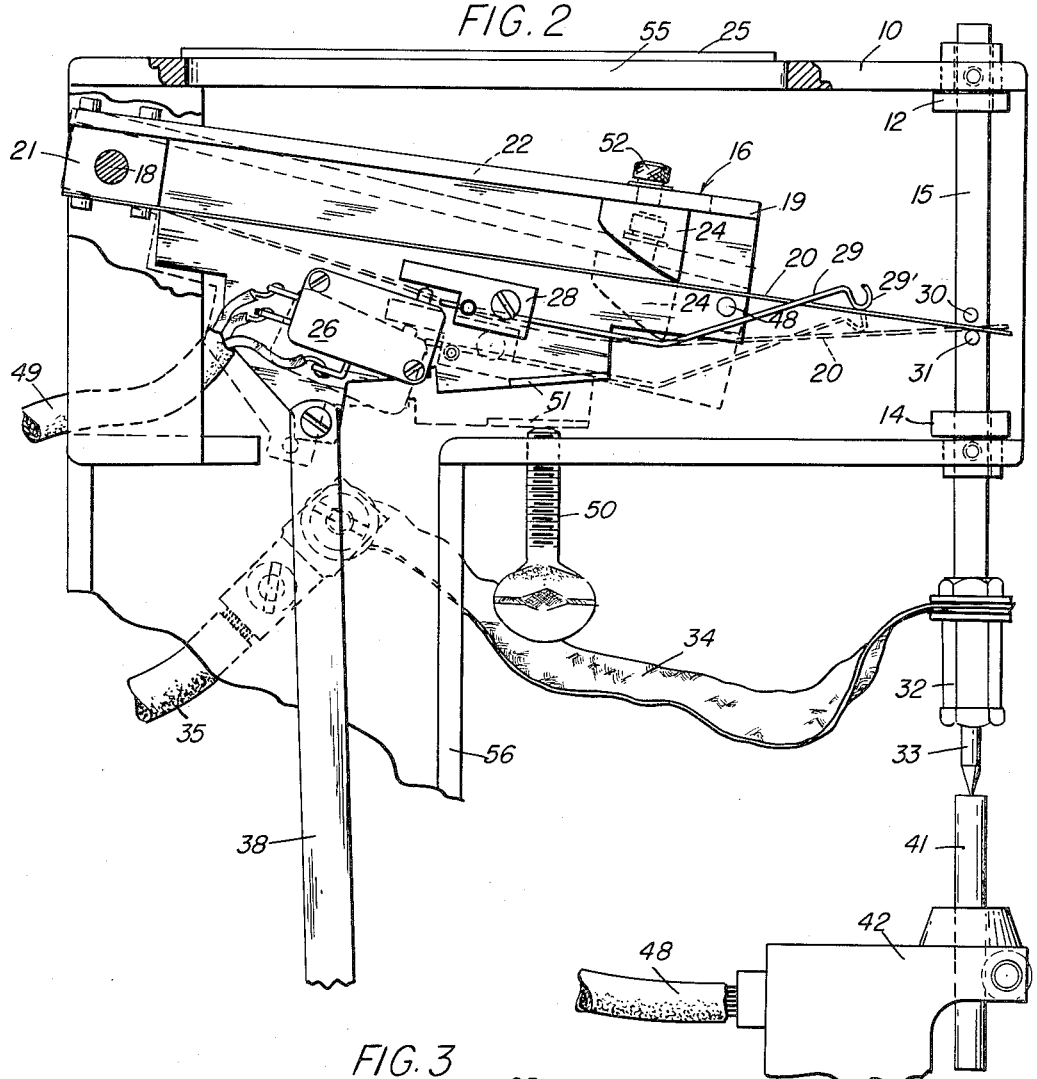
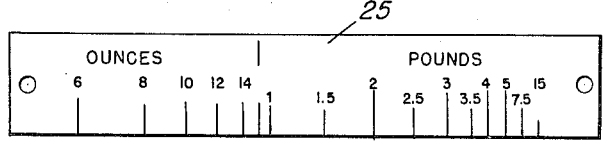
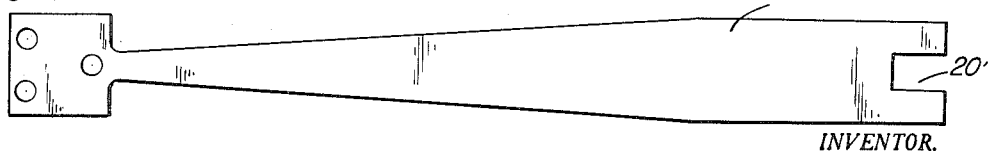
INVENTOR.
Lux H. Ewald
BY
Churchill, Rich, Weymouth & Engel
Attorneys United States Patent Office 2,750,484
Patented June 12, 1956

2,750,484

UNIFORM PRESSURE RESISTANCE WELDING APPARATUS

Lux H. Ewald, New York, N. Y.

Application March 7, 1955, Serial No. 492,563

10 Claims. (Cl. 219—4)

This invention relates to spot-welding, more particularly to improvements in welding heads for spot-welding apparatus designed particularly for operation on small parts.

In the spot-welding of delicate parts or of materials with a narrow plastic range it is desirable to have a welding head which permits exact adjustment of the welding pressure within wide limits, and a switch which will trigger a suitable power supply at a point when the exact welding pressure is reached, independent of variations in the electrode position caused by variations in the thickness of the parts to be welded, or caused by filing, cleaning or positioning of the electrodes themselves.

It is further desirable to have a low mass in the movable electrode to permit the electrode to exert a forging pressure during the short duration of the plastic state of the metals and to follow through on this forging action. It is also desirable to have the welding electrodes guided rigidly, and yet move with low friction, to have means of aligning the two electrodes, to provide space for mounting fixtures, and to have easy access to the welding electrodes for observation with a microscope, if necessary.

The foregoing objects are achieved by the invention which will best be understood from the following description of the present preferred embodiment thereof taken in conjunction with the drawings, in which:

Fig. 2 is a similar view showing some of the parts in different positions and showing also the movement which energizes the welding electrodes;

Fig. 3 is a plan of the pressure scale; and

Fig. 4 is a plan of one form of leaf spring which may be used.

Figure 1:
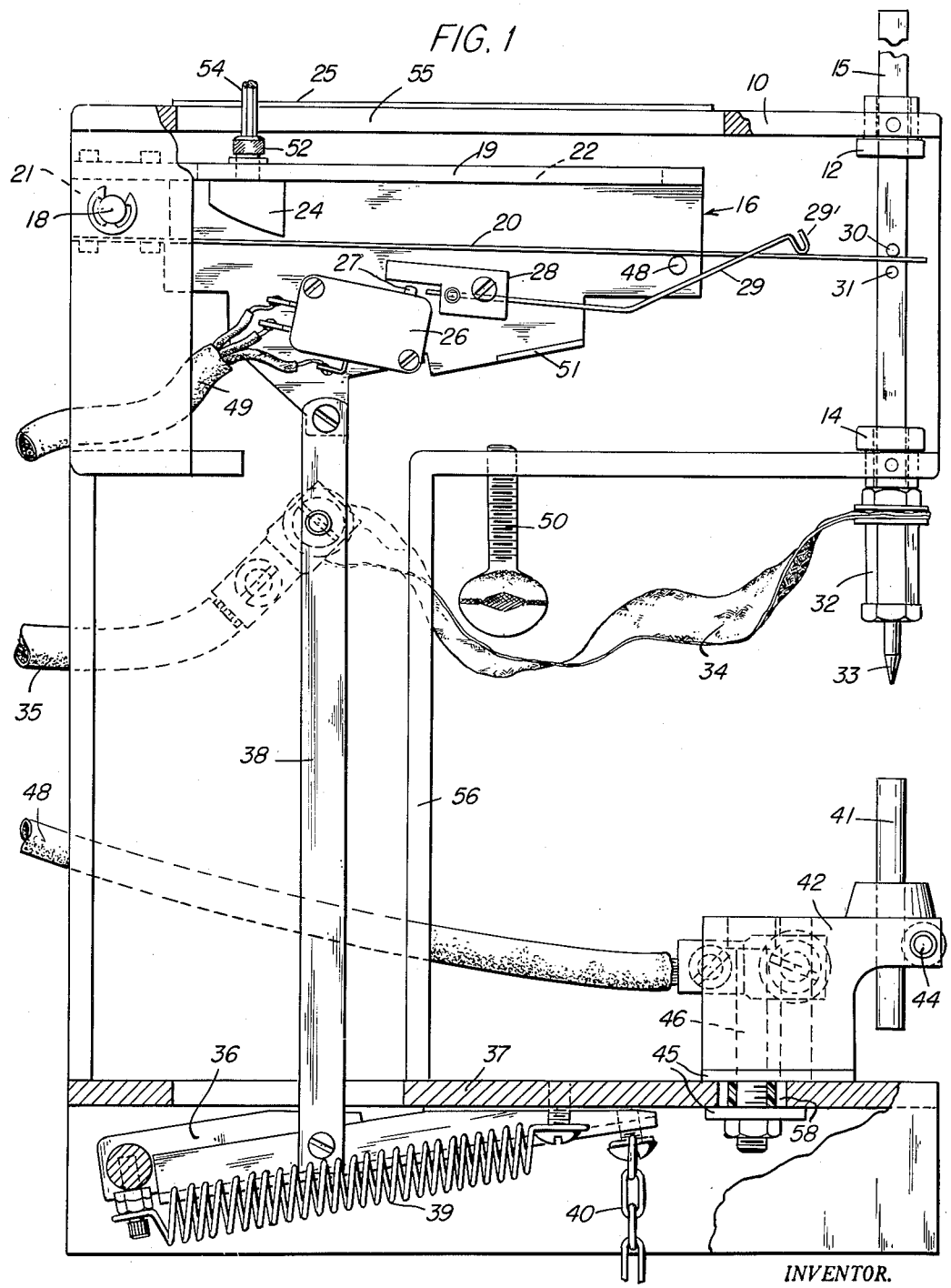
Fig. 1 is a side elevation, partly in section of a welding head.

Referring to the drawings, the welding head consists of a channel frame 10 in which are mounted bushings 12, 14 which guide a sliding vertical welding arm 15 moving freely up and down with a minimum of sideplay. In the frame is also mounted a pressure arm indicated generally at 16 pivoted on shaft 18. The pressure arm consists essentially of angle piece 19, and leaf spring 20 held together by attachment to a pivot block 21. In a slot 22 in the angle piece 19 is mounted a movable slide 24 which can be clamped in any position along the slot, the position of the slide being indicated on a scale 25 mounted on top of the frame. This scale is calibrated (as shown in Fig. 3) directly in ounces, pounds, or other units of pressure.

The leaf spring 20 can be contoured to either a linear scale or a non-linear scale, for purposes which will hereinafter appear, according to the requirements of the range of materials to be welded (see Fig. 4). For very thin and delicate materials for instance, a wide adjustment in the very low pressure range may be desirable, the spring would then be contoured as indicated on the drawing. For a linear scale the heavy end of the spring would be near its free end. The same result may also be achieved by using a spring of uniform width but of varying thickness, or by using a combination of several superposed springs of the same or different lengths, widths, thickness or stiffness of material.

On angle piece 19 there is also mounted a snap switch 26 of the microswitch type with an actuating button 27, and pivoted rocker arm 28 to which is attached trip rod 29. The switch is of a type requiring low operating force and having exact tripping point. On the welding arm 15 are mounted transverse pins 30 and 31 and electrode holder 32, carrying electrode 33. Power conductor 34 is made of very flexible, braided strands of copper and is connected to power cable 35.

The pressure arm 16 is linked to a pivoted lever 36 in the base 37 through a link 38. In the base is also coil spring 39 which holds the pressure arm in its upper position when lever 36 is not pulled downwardly. Attached to lever 36 is a chain 40 terminating in a conventional foot pedal (not shown).

The lower electrode 41 is held in electrode holder 42 and clamped with screw 44. This electrode holder is electrically insulated from the base by insulation 45 and held in place on the base by bolt 46 which is also insulated from the base in known manner. Welding current is brought to the lower electrode through cable 48.

As to the functional interrelationship of the principal parts above described, it will be seen in Fig. 4 that leaf spring 20 has a slot 20' in its free end so that it can be slipped between the spaced horizontal pins 30 and 31 carried by welding arm 15, these pins extending outwardly of said arm preferably on both sides thereof and being engageable by both sides of the spring 20. The trip rod 29 has a crooked end 29' which rests on top of leaf spring 20 and serves to rotate rocker arm 28 about its pivot, to actuate the switch 26, in accordance with the position of that point on the spring which engages end 29'. This point moves relative to the pivot point of the rocker arm 28 in accordance with the flexing of spring 20. This interrelationship varies according to the curvature of spring 20 at the time a weld is made and the curvature, in turn, is determined by the location of the point at which the movable slide 24 exerts downward pressure on the spring. Slide 24 is, in effect, a fulcrum for the spring. As shown in Fig. 1, spring 20 is mounted cantilever fashion and is normally substantially straight. It supports arm 15 in raised position through pin 30. Spring 20 is supported in this position by a pin 48 on arm 16. When pressure arm 16 is moved downwardly by pulling on chain 40, as shown in Fig. 2 in solid lines, spring 20 moves with it and arm 15 drops by gravity until electrode 33 engages fixed electrode 41 or work resting thereon. Thereafter pressure is exerted on arm 15 by spring 20, acting through pin 31, by reason of the pressure on the spring exerted by slide 24. When slide 24 is in the position shown in Fig. 1, switch 26 is tripped with a minimum pressure on the electrodes because there is a high degree of movement per unit of pressure relative to arm 16, of the part of spring 20 on which the end 29' of the trip rod rests. When slide 24 is in the position of Fig. 2 the pressure on the electrode when switch 26 is tripped is near its maximum because the free length of spring 20, between the point of slide 24 and pin 31 is much shorter and much greater pressure is required to deflect the part of spring 20 on which trip rod end 29' rests enough to actuate the switch.

It will be understood that the switch, through cable 49 attached to its terminals, controls the welding current supply, which may be of the stored energy type or be a welding transformer having a suitable timer. The type of supply will determine the type of switch used. When the switch button 27 is actuated by rocker arm 28, a surge of current of predetermined duration is sent through conductors 34, 35 and 48 and the electrodes 33 and 41 and the weld is made. The switch, in effect, triggers the power supply when the desired pressure is exerted on the electrodes by spring 20.

The maximum downward movement of arm 16 may adjustably be limited by a thumb screw 50, threaded into the lower side of the channel-shaped head 10, which engages an ear 51 formed on arm 16 along its lower edge. This screw may be set to stop the arm 16 at a point just below that where the switch will be tripped.

While it is already known to use a leaf spring with an adjustable fulcrum to move a welding electrode, the present invention provides a novel means for doing so which provides a simple and inexpensive structure and one which makes possible the use in conjunction therewith of a direct reading pressure scale. In the preferred embodiment illustrated, slide 24 is supported in slot 22 in angle piece 19 by a socket-head bolt 52 which receives an Allen wrench 54 (Fig. 1) by which the bolt is turned and the slide moved. This wrench is inserted through slot 55 in the top side of channel head 10, alongside of which scale 25 (Fig. 3) is disposed, the position of the wrench 54 being read against the scale which is calibrated directly in ounces and pounds. In this structure the slide 24 can be moved instantly to any point on the scale from minimum to maximum pressure. Obviously, if the head 10 were open so that pressure arm 16 were visible, scale 25 could be applied directly to the pressure arm.

The mechanism arranged in the channel head 10 and its supporting pedestal 56 may be enclosed by providing the head with a suitable sheet metal cover (not shown). The mechanism in base 37 is enclosed by the side walls thereof, it being also of channel shape with the web of the channel uppermost.

The lower electrode holder 42 is arranged to be adjustable in position by pivoting on bolt 46 which is also made movable by mounting it in a slot 58 in the base. Thus the electrodes 33 and 41 may be aligned.

Another important and useful feature of the invention is that switch 26 is actuated solely by the deflection of spring 20 so that the pressure exerted at any setting is necessarily always the same. This would not be the case were the switch actuated through other mechanism which in turn controlled the deflection of the spring at the time of making the weld. It will be appreciated that if one desires a welding head which operates at a single pressure, the slide 24 may be replaced by a fixed stop on the pressure arm 16 which will engage the spring 20.

The principle of the invention may be applied to welding devices other than the type of welding head above described, which has a pair of electrodes. In some instances the work itself is used as one electrode and a hand welding head is provided having a single electrode which is pressed against the work. In such a device, the equivalent of electrode 33 would be pressed on the work, the pressure arm 16 would be fixedly mounted and the spring 20 would apply the desired force to the electrode under hand pressure applied thereto, triggering the switch 26 when a predetermined pressure is reached.

Another type of apparatus to which the invention is applicable, substantially in the form shown, is that wherein the welding electrodes are mounted in a hinged frame operating on the principle of a pair of pliers so that the work may be clamped between them.

Various details of construction as above described may be changed or modified without departing from the invention, wherefore they are to be considered as merely illustrative and not as limitations.

What is claimed is:

1. A spot-welding head comprising a frame 10, a welding arm 15 mounted for reciprocation therein, a pressure arm 16 pivotally (18) supported on said frame, a leaf spring 20 connected at one end (21) with said pressure arm and having its other free end 20' loosely connected (30, 31) to said welding arm, a slide 24 carried by and movable longitudinally of the pressure arm and adapted to bear against said spring 20 in a preselected position determined by the welding pressure to be applied through said welding arm, a welding current control switch 26 fixed to the pressure arm, a pivoted rocker 28 carried by the pressure arm 16 and adapted to actuate said switch, and a trip rod 29 for rotating said rocker having an end 29' arranged to be moved by the free end portion of said spring 20.

2. A spot-welding head comprising a frame, a welding arm mounted for reciprocation therein, a pressure arm pivotally supported on said frame, a leaf spring connected at one end with said pressure arm and having its other free end loosely connected to said welding arm, a slide carried by and movable longitudinally of the pressure arm and adapted to bear against said spring in a preselected position determined by the welding pressure to be applied through said welding arm, a welding current control switch fixed to the pressure arm, a pivoted rocker carried by the pressure arm and adapted to actuate said switch, and a trip rod for rotating said rocker having an end arranged to be moved by the free end portion of said spring.

3. A spot-welding head comprising a frame, a welding arm mounted for reciprocation therein, a pressure arm pivotally supported on said frame, a leaf spring connected at one end with said pressure arm and having its other end connected to said welding arm, a fulcrum member carried by the pressure arm and adapted to bear against said spring in a predetermined position according to the welding pressure to be applied through said welding arm, a welding current control switch mounted on the pressure arm, a pivoted rocker carried by the pressure arm and adapted to actuate said switch, and a trip rod for rotating said rocker having an end arranged to be moved by the free end portion of said spring.

4. A spot-welding head comprising a frame, a welding arm mounted for reciprocation therein, a pressure arm pivotally supported on said frame, a leaf spring connected at one end with said pressure arm and having its other free end loosely connected to said welding arm, a slide carried by and movable longitudinally of the pressure arm and adapted to bear against said spring in a preselected position determined by the welding pressure to be applied through said welding arm, a welding current control switch fixed to the pressure arm, and means for actuating said switch responsive to movement relative to said pressure arm of a point on said spring intermediate said slide and said welding arm.

5. A spot-welding head comprising a frame, a welding arm mounted for vertical reciprocation therein, a pressure arm pivotally supported at one end on said frame, a cantilever leaf spring connected at one end to the pivoted end of said pressure arm and having in its other free end a notch to receive said welding arm, stops on the welding arm on either side of said spring, a slide carried by and movable longitudinally of the pressure arm and adapted to bear against said spring in a preselected position determined by the welding pressure to be applied through said welding arm, a welding current control switch fixed to the pressure arm, a pivoted rocker carried by the pressure arm and adapted to actuate said switch, and a trip rod fixed rigidly to said rocker and having an end positioned to overlie the free end portion of said spring and arranged to be moved thereby.

6. An adjustable pressure spot-welding head comprising a frame, a vertically reciprocable electrode holder carried thereby, a pressure arm pivoted thereto with its free end extending toward said holder, a leaf spring connected with the pivoted end of said arm adapted to move said holder, a slide carried by said arm and adjustable longitudinally thereof adapted to bear against said spring, switch means for welding current actuated in accordance with a predetermined flexure of said spring, and a scale readable against the position of said slide to indicate the pressure on the electrodes at the time the switch is actuated.

7. In a spot-welding head having a fixed electrode and a movable electrode, means for applying uniform welding pressure through the movable electrode independently of the spacing between electrodes when they are engaged with the work, said means comprising, a pivoted pressure arm, a leaf spring attached at one end to said arm and adapted to apply pressure through its other end to said movable electrode, means for moving said arm, means carried by said arm acting as a fulcrum for said spring when the arm is moved, a switch mounted on said arm, and switch operating means actuated by relative movement between said arm and a point on said spring intermediate said fulcrum and its said other end upon a predetermined degree of flexure of the spring.

8. A device according to claim 7 wherein said fulcrum means is adjustable longitudinally of said leaf spring.

9. A device according to claim 7 wherein said switch operating means comprises a rocker pivoted to said arm, adapted to engage the switch and having an arm in engagement with said point on the spring for movement therewith.

10. A spot welding device comprising an electrode, a movable holder therefor, a leaf spring adapted to press at one end on said holder to apply pressure to the electrode, means for mounting the said spring at its other end in cantilever fashion, a slide adjustably movable longitudinally of said spring and acting as a fulcrum therefor, means for supporting said fulcrum in fixed relation to the said spring-mounting means through which the electrode may be pressed against the work, a switch for controlling the welding current, and means for actuating said switch responsive to the deflection of a point on that portion of the spring between said fulcrum and its connection to said holder.

No references cited.